April 30, 1957     J. ALBERTOLI     2,790,532
CAN UNSCRAMBLER
Filed June 26, 1953
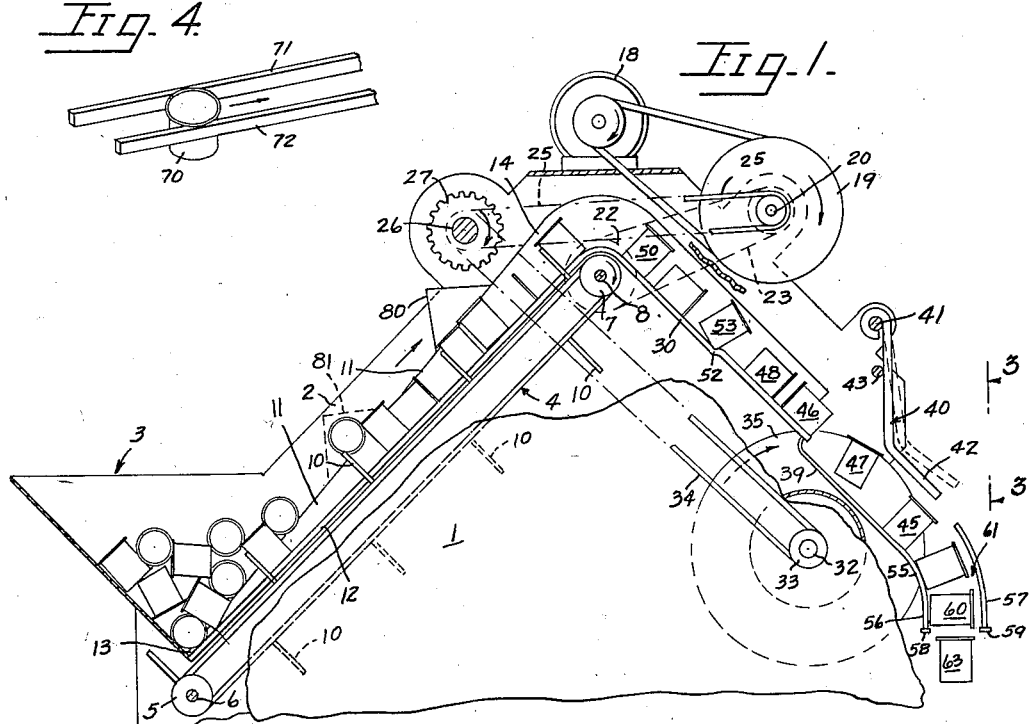
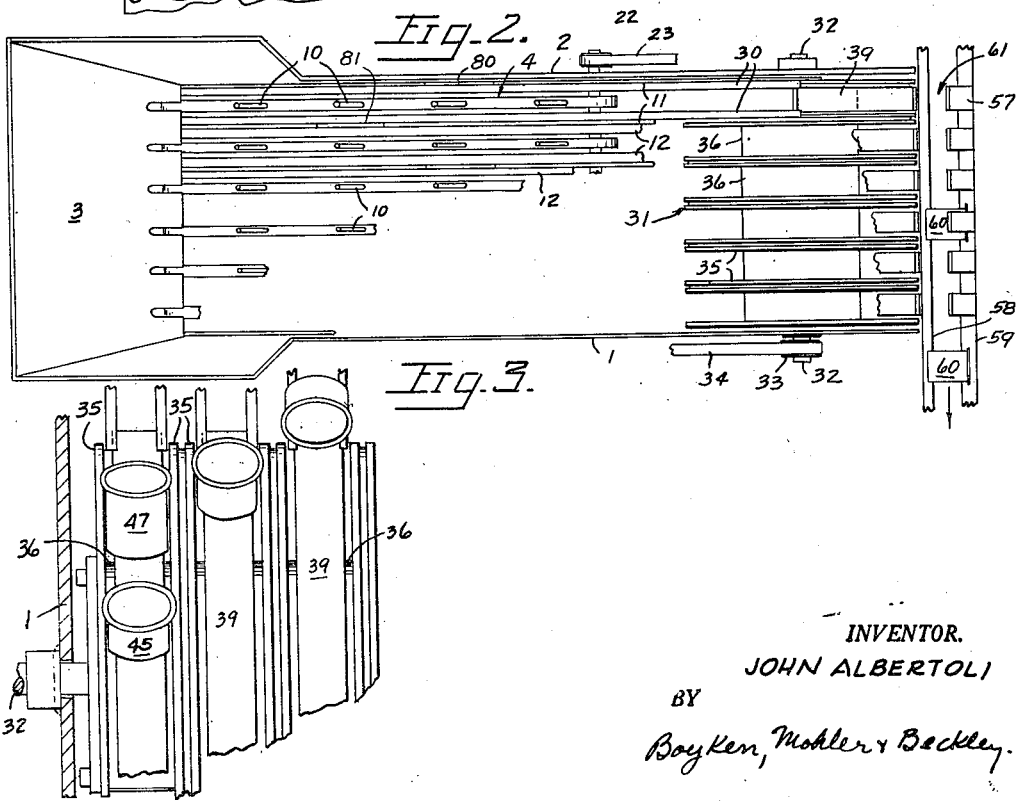
INVENTOR.
JOHN ALBERTOLI
BY
Boyken, Mohler & Beckley

United States Patent Office 2,790,532
Patented Apr. 30, 1957

2,790,532

CAN UNSCRAMBLER

John Albertoli, San Francisco, Calif.

Application June 26, 1953, Serial No. 364,313

8 Claims. (Cl. 198—30)

This invention relates to a method and apparatus for unscrambling cans. Although the present invention will be described in connection with unscrambling empty cans, certain portions of the apparatus hereinafter described lend themselves to use with full cans in a manner which will subsequently be explained.

It is extremely desirable for canners to purchase empty cans in reusable containers in which the cans are arranged in a haphazard pile. However, to make such a procedure economical, it is necessary to obviate any manual handling such as is required to take the cans from the container and arrange them in neat rows for subsequent movement to the can filling machinery.

It will be understood that the problems involved in unscrambling empty cans differ with the dimensions of the cans. That is, a device which will unscramble flat cans with 100% efficacy may be unsuitable for long cans. The present invention is particularly effective in unscrambling relatively long cans and my copending United States patent application Serial No. 341,309, filed March 9, 1953, and entitled Unscrambler for Empty Cans, discloses a method and apparatus for unscrambling flat cans, that is, relatively short cans.

The main object of the present invention is therefore the provision of an empty can unscrambler which will unscramble cans from a haphazardly arranged pile and automatically orient them in a neat orderly row with the open ends of all the cans directed in the same direction.

Another object of the invention is the provision of an economical and effective apparatus for carrying out the above method.

Fig. 1 is a semi-schematic side elevational view of the preferred form of the apparatus, portions being broken away and in section to show internal structure.

Fig. 2 is a plan view of the apparatus of Fig. 1.

Fig. 3 is a greatly enlarged fragmentary end elevational view of the device showing the rotating discs.

Fig. 4 illustrates schematically a modification of the invention.

Empty cans are generally provided with a radially outwardly extending annular rim around their open ends. The outer diameter of this rim is substantially larger than the diameter of the cylindrical sidewalls of the can; the extra material being used to crimp the rim to the top of the can when said top is subsequently placed over the open end after the can is filled with its contents.

Advantage is taken of this rim by the present invention in the can orienting process and in the drawings the size of said rim is exaggerated for clarity.

Although the preferred form of the apparatus for carrying out the invention may take many forms, it is convenient to provide a housing which includes a pair of lateral side plates 1, 2 of any suitable size. At one end of the housing there is provided a relatively large upwardly opening bin generally designated 3 which is adapted to receive a haphazardly arranged pile of cans.

Positioned under bin 3 are the idler ends of a plurality of conveyors generally designated 4. More than one conveyor is used merely to augment the capacity of the device and for this reason, only one conveyor and its associated guides, etc. will be described in detail.

As best seen in Fig. 1, each conveyor 4 is provided with an idler pulley 5 spaced below the bin 3 and supported on a shaft 6 which in turn may be rotatably supported at its opposite ends in the side plates 1, 2.

The conveyors 4 extend outwardly and upwardly from the bin 3 and each is provided with a driving pulley 7 at its end remote from bin 3. Pulley 7 is carried by shaft 8 which, in turn, may be rotatably supported in side plates 1, 2.

At spaced points along the length of the conveyor belt or chain are laterally outwardly projecting fingers or paddles 10 which, when the upper run of the conveyor 4 is moving upwardly, serve to move the cans out of bin 3.

Extending alongside each conveyor 4 are stationary guides 11, which may be conveniently made of vertically disposed flat plates. The conveyor 4 is positioned centrally between the pair of guides 11 so that the latter define a path of travel therebetween and along which the conveyor 4 moves the cans from bin 3.

The guides 11 are spaced apart a distance less than the length of a can and a distance greater than the maximum diameter of a can. The maximum diameter will, of course, be the outer diameter of the annular rim around the mouth or open end of the can.

By placing the guides 11 in this manner, all cans entering the path between guides 11 have their central longitudinal axes coplanar and in the central vertical plane of the conveyor. However, some cans are upright and some on their sides and these may be directed in different directions.

Integral with guides 11 and extending oppositely inwardly therefrom toward conveyor 4 are a pair of flat bar strips 12 on which the cans are slidably supported so that the conveyor 4 is relieved of the weight of the cans.

The inclination of the conveyors 4 is preferably made about as shown in Fig. 1 to insure that all cans which are not received between guides 11 are returned to bin 3 by gravity.

It has been found that the capacity of the device may be considerably increased by forming the guides 11 so that their depth, that is, their extent in a direction normal to conveyor 4, is relatively small within the bin and gradually increases along the length of the guides. Preferably the depth of guides 11 is substantially zero at a point 14 adjacent the bottom of the bin and gradually increases to a depth greater than the depth of the can at a point 14 adjacent the driven end of the conveyor.

Thus it is seen that each guide 11 is substantially triangular along its working length with the apex of the triangle within the bin 3. If the guides are made rectangular and substantially the same depth throughout their length as shown in United States Letters Patent No. 2,633,971, dated April 7, 1953, the cans have less tendency to fall into the path between the guides while in the bin. The herein described structure is therefore an improvement over that shown in said patent. In this particular respect, the present invention is adapted for use with full cans in like manner as the device of the above-mentioned patent.

The improved efficiency of the above described structure is attributable to the coaction of the fingers or paddles 10 with the guides 11. In other words, as the fingers 10 drive the cans upwardly along the inclined guides the resultant agitation of the cans tends to cause all of the cans to take up positions between the guides.

To further enhance the likelihood of the cans orienting themselves to positions between guides 11 upwardly extending generally triangular projections 80 (Fig. 1) may be integrally secured to the upper edges of guides 11 and coplanar therewith. Projections 80, shown in full line in Fig. 7, may be provided adjacent the upper ends of the guide 11, however similar projections 81, shown in dotted lines in Fig. 1 may be provided at points spaced downwardly from projections 80 if so desired. The preferable arrangement is to provide upper projections 80 on alternate guides 11 and to provide lower guides 81 on the remaining guides in staggered relationship with the upper guides.

The projections 80, 81 have the effect of throwing the downwardly moving cans transversely of the guides 11 thus enhancing the likelihood of such cans being received between the guides. In like manner, upwardly moving cans are more apt to fall between the guides 11.

The power for operating the unscrambler may be obtained from an electric motor 18 mounted on top of the housing and which drives a relatively large pulley 19 mounted on a shaft 20 which, in turn, is rotatably mounted on side plates 1, 2. The rotational speed of shaft 20 is thus considerably slower than the motor shaft.

Mounted on the driving shaft 8 of conveyors 4, is a pulley 22 which is driven by means of a belt 23 from the shaft 20.

Also driven from shaft 20, by means of a belt 25 is a shaft 26 extending transversely of the housing and rotatably supported thereon. Shaft 26 is above the paths of travel defined by guides 11 and supports a plurality of rubber wheels 27 which engage any cans stacked above the guides 11 and return the same downwardly to bin 3.

Adjacent the driving pulleys 7, the flat bar can supports 12 are bent downwardly to provide downwardly extending portions 30 along which the cans thereon may slide by gravity.

Adjacent the lower end of portion 30 is a drum like member generally designated 31 which is supported on a transverse shaft 32 rotatably supported at its ends on side plates 1, 2. At one end, the shaft 32 is provided with a pulley 33 driven by a belt 34 from shaft 26 (Fig. 1).

Member 31 comprises a plurality of pairs of spaced opposed disks 35 (Fig. 3) between which the cans are adapted to be received. These disks 31 are preferably integrally secured to shaft 32 and are provided with a hub portion 36 to stiffen said disks so that the spacing between the opposed faces of said disks may be accurately predetermined and retained.

The spacing between said opposed faces is slightly less than the outer diameter of the annular rim of a can and slightly greater than the diameter of the cylindrical sidewalls of a can.

The disks 35 are positioned so that the upper edges of the same are slightly above the path of travel of the cans on supports 30.

As best seen in Fig. 1, regardless of the manner in which the cans approach the disks 35, the latter will engage the annular rim of the cans at diametrally opposite points (Fig. 3) so that the cylindrical body of each can is suspended at said points from the upper edges of disks 35.

The can supports 30 terminate adjacent the upper edges of disks 35, and between the ends of said supports and the lower discharge side of disks 35 a central flat bar strip 39 is provided in each path. This strip 39 is secured at one end to the underside of the adjacent ends of supports 30 and extends generally downwardly and forwardly. Strip 39 is spaced from the upper peripheries of disks 35 so that the cans do not engage the same until they have traversed a substantial arc on said disks.

During the time the cans are suspended between disks 35 their forward inertia may tend to cause them to swing in a pendulum fashion, but this action dampens out before the cans are disengaged from the disk.

To prevent the cans from swinging excessively, an arm generally designated 40 (Fig. 1) may be provided. Arm 40 may consist of a section of rod pivotally supported at one end on a pivot 41 and provided with a lower section 42 generally parallel to the can supports 30 and substantially tangent to but spaced slightly radially outwardly of the disks 35.

A normal position of arm 40 may be predetermined by a stop 43 against which arm 40 acts by gravity. Preferably the arm 40 is of such a mass that it will be swung slightly to the dotted line position of Fig. 1 when struck by a swinging can. The action of arm 40 thus also contributes to dampening the pendulum action of the cans.

The central strip 39 is positioned so as to be slidably engaged by the bottoms of the cans as the latter reach the end of the working arc of disks 35. Thus, the cans are engaged at their bottoms after they are oriented with their open ends directed generally upwardly.

It is important to note that each can will be automatically oriented to the position of can 45 (Fig. 1) regardless of how it approaches the disks 35. For example, can 46 (Fig. 1) will continue to slide downwardly with the cylindrical body of the can entering the space between the disks 35 until its annular rim is engaged at diametrally opposite points by the peripheries of disks 35. Due to the rotation of disks 35 in the direction shown (Fig. 1) can 46 will continue to the position of can 47 (Figs. 1, 3) at which point, it is suspended by its rim as above described.

Can 48 (Fig. 1), which is sliding with its open end leading, will automatically be righted when its rim engages the disks 35. This result is in part due to the relatively slight inclination of the peripheries of disks 35 relative to the supports 30 and in part due to the fact that the peripheries of disks 35 are moving forwardly.

An upright can, such as indicated at 50 (Fig. 1), will obviously fall between the disks 35 the position of can 47 and an inverted can will also become suspended when its rim engages disks 35.

However, inasmuch as a vertically disposed can is subject to greater impact upon engaging disks 35 than a horizontal can, it is preferable that the cans approach disks 35 on their sides in the position of either can 46 or 48. To achieve this result, a slight obstruction or jag such as indicated at 52 may be provided on can supports 30. The effect of this obstruction is to topple an upright can such as indicated at 53.

It will be understood that when all cans are oriented in the same manner, the main object of the present invention is achieved. Thus, inasmuch as all cans will ultimately attain the position of can 45, any different orientation desired may be achieved by well known turning devices.

However, inasmuch as it is desirable to transport cans on their sides in most cases, the central strip 39 may be formed to a bend 55 to provide a vertically downwardly extending portion 56.

Spaced outwardly from portion 56 is a guide 57 which cooperates with portion 56 and bend 55 to define a chute 61 through which the oriented cans pass. Along the lower edges of portion 56 and guide 57 are a pair of inclined runners 58, 59 respectively along which the cans may roll by gravity to any desired station.

The action of the chute 61 is to turn the cans on their sides to the position indicated by can 60. Runners 58, 59 are spaced apart a distance slightly less than the length of the cans and slightly greater than the outer diameter of the annular rim of the can so that, in the event that a can reaches chute 61 without being turned as shown in Fig. 1, such can will drop downwardly through the opening between runners 58, 59 as indicated by can 63 (Fig. 1). These rejected cans, if any, may be caught in a suitable receptacle.

The apparatus of Fig. 1 is the preferred form of the invention, but is illustrative of only one manner in which the invention may be carried out. Inasmuch as the method used lends itself to being carried out by various mechanisms, I do not wish to be restricted to the exact form shown.

Expressed as a method, the invention may be defined at this point as the steps of disposing the cans with their axes coplanar with a common vertical plane, and successively supporting each can at diametrally opposite points the under side of its rim during movement of the cans in one direction; and thereafter successively supporting each can on its bottom during said movement.

It is important to note that the cans must be kept moving in their direction of travel during the above mentioned steps to achieve a practical result. The method shown in Fig. 1 employing rotating disks is convenient and efficient because the forward motion of the cans is readily maintained.

Another means for carrying out the same method is seen in Fig. 4 wherein the can 70 is suspended between downwardly inclined rods 71, 72 spaced apart the required distance. By making the surface of rods 71, 72 smooth, the cans may be made to slide along the same by gravity, although, if desired, conventional vibrating means may be employed to facilitate movement of the cans along the length of said rods.

I claim:

1. In an empty can unscrambler, for use with cans of the type having cylindrical sidewalls, a bottom closing one end and open at their opposite end and with a radially outwardly extending annular rim around said open end, a bin for receiving a pile of indiscriminately arranged cans, a conveyor for moving cans out of said bin along a path of travel in one direction, means associated with said conveyor for automatically arranging said cans with their central longitudinal axes coplanar with the central vertical plane of said conveyor, a pair of rim engaging elements horizontally spaced apart a distance less than the outer diameter of said rim and greater than the outer diameter of said cylindrical sidewalls, said elements being positioned to successively receive cans from said conveyor whereby said cans are automatically suspended from said elements at diametrally opposite points on said rims with their open ends directed upwardly, and means supporting the bottoms of said suspended cans for removing said cans from said elements with said open ends directed outwardly of said supporting means in a direction substantially normal to said elements.

2. In an empty can unscrambler, for use with cans of the type having cylindrical sidewalls, a bottom closing one end and open at their opposite end and with a radially outwardly extending annular rim around said open end, a bin for receiving a pile of indiscriminately arranged cans, a conveyor for moving cans out of said bin along a path of travel in one direction, means associated with said conveyor for automatically arranging said cans with their central longitudinal axes coplanar with the central vertical plane of said conveyor, a pair of rim engaging elements horizontally spaced apart a distance less than the outer diameter of said rim and greater than the outer diameter of said cylindrical sidewalls, said elements being positioned to successively receive cans from said conveyor whereby said cans are automatically suspended from said elements at diametrally opposite points on said rims with their open ends directed upwardly, and means supporting the bottoms of said suspended cans for removing said cans from said elements in an upright position, means for moving said elements in said direction during said movement of the cans.

3. In a can unscrambler for cylindrical cans, a bin for receiving a pile of indiscriminately arranged cans, a pair of opposed parallel elongated guides extending at one of their corresponding ends into said bin for receiving cans therebetween, said guides being horizontally spaced apart a distance less than the length of a can and greater than the maximum diameter of a can whereby the axes of all cans between said guides will be in a plane substantially parallel to and between said guides, an elongated conveyor including can supporting means between said guides for moving cans outwardly of said pile and along the length of said guides, the edges of said guides that are remote from said conveyor being spaced from the latter at a point in said bin a distance less than the diameter of a can and being spaced from said conveyor a distance greater than the diameter of a can at a point outwardly of said bin.

4. In a can unscrambler for cylindrical cans, a bin for receiving a pile of indiscriminately arranged cans, a pair of opposed parallel elongated guides extending at one of their corresponding ends into said bin for receiving cans therebetween, said guides being horizontally spaced apart a distance less than the length of a can and greater than the maximum diameter of a can whereby the axes of all cans between said guides will be in a plane substantially parallel to and between said guides, an elongated conveyor including can supporting means between said guides for moving cans outwardly of said pile and along the length of said guides, the edges of said guides that are remote from said conveyor being spaced from the latter at a point in said bin a distance less than the diameter of a can and being spaced from said conveyor a distance greater than the diameter of a can at a point outwardly of said bin, said edges of said guides being inclined upwardly from the horizontal in a direction outwardly of said bin whereby cans supported on said edges will be urged toward said bin by gravity.

5. An empty can unscrambler for use with cylindrical cans of the type having a bottom closing one end and open at their opposite end and with a radially outwardly extending annular rim around said open end, a bin for receiving a pile of indiscriminately arranged cans, a pair of horizontally spaced elongated guides extending outwardly from said bin and defining a path of travel therebetween, an elongated conveyor between said guides for moving cans from said pile along said path, said guides being spaced apart a distance less than the length of a can and a distance greater than the maximum diameter of said rim whereby the cans in said path are arranged with their axes coplanar with a vertical central plane between said guides, a pair of vertically disposed disks mounted for movement of their upper edges together generally in the same direction as the movement of said cans, said disks being horizontally spaced apart at their peripheries a distance slightly greater than the diameter of the cylindrical sidewalls of said cans and a distance less than the outer diameter of the rims of said cans, means for transferring said cans from said path to said upper edges of said disks whereby said cans are suspended from said edges at diametrally opposite points on said rim with their open ends directed upwardly, means supporting the bottoms of said suspended cans for moving said cans away from said disks with their open ends directed generally radially outwardly of said disks.

6. In an empty can unscrambler for use with empty cylindrical cans having a bottom closing one end and open at their opposite end and with an annular radially outwardly extending rim around said open end, means for arranging said cans with their central longitudinal axes in a vertical plane but with said cans indiscriminately arranged relative to the disposition of their axes in said plane, a pair of horizontally spaced rim engaging elements spaced apart a distance slightly greater than the diameter of the cylindrical sidewalls of said cans and less than the outer diameter of the rims of said cans, means for feeding said cans from said can arranging means to positions between said elements whereby said cans are automatically suspended from said elements at diametrally opposite points on their rims and with their open ends directed upwardly, means supporting the bottoms of said suspended cans for removing said cans from said elements with their open ends directed generally radially outwardly of said disks.

7. In a can unscrambler for cylindrical cans, a bin for receiving a pile of indiscriminately arranged cans, a pair of opposed parallel elongated guides extending at one of their corresponding ends into said bin for receiving cans therebetween, said guides being horizontally spaced apart a distance less than the length of a can and greater than the maximum diameter of a can whereby the axes of all cans between said guides will be in a plane substantially parallel to and between said guides, an elongated conveyor including can supporting means between said guides for moving cans outwardly of said pile and along the length of said guides, the edges of said guides that are remote from said conveyor being straight and spaced from the latter at a point in said bin a distance less than the diameter of a can and being spaced from said conveyor a distance greater than the diameter of a can at a point outwardly of said bin, said conveyor including a plurality of fingers at spaced points along the length of the same and extending into the space between said guides, said fingers extending beyond said can supporting means a distance less than the maximum spacing between said edges and said means.

8. In a can unscrambler for cylindrical cans, a bin for receiving a pile of indiscriminately arranged cans, a pair of opposed parallel elongated guides extending at one of their corresponding ends into said bin for receiving cans therebetween, said guides being horizontally spaced apart a distance less than the larger dimension of a can and greater than the lesser dimension of a can whereby the axes of all cans between said guides will be substantially coplanar or parallel, an elongated conveyor including can supporting means between said guides for moving cans outwardly of said pile and along the length of said guides, the edges of said guides that are remote from said conveyor being spaced from the latter at a point in said bin a distance less than the lesser dimension of a can and being spaced from said conveyor a distance greater than the greater dimension of a can at a point outwardly of said bin.

References Cited in the file of this patent
UNITED STATES PATENTS

| | | |
|---|---|---|
| 1,063,588 | Peterson | June 3, 1913 |
| 1,696,715 | Huddleston | Dec. 25, 1928 |
| 2,362,517 | Woodberry | Nov. 14, 1944 |
| 2,392,509 | Sells | Jan. 8, 1946 |
| 2,406,176 | Vergobbi | Aug. 20, 1946 |
| 2,421,515 | McNamara | June 3, 1947 |
| 2,546,866 | Overly | Mar. 27, 1951 |
| 2,649,214 | Kirby | Aug. 18, 1953 |

FOREIGN PATENTS

| | | |
|---|---|---|
| 530,362 | Germany | July 28, 1931 |